TAPE TRANSPORT SYSTEM

Filed April 7, 1958

3 Sheets-Sheet 1

INVENTOR.
PAUL R. GILSON
BY Christie, Parker & Hale
ATTORNEYS

Sept. 13, 1960 P. R. GILSON 2,952,415

TAPE TRANSPORT SYSTEM

Filed April 7, 1958 3 Sheets-Sheet 2

INVENTOR.
PAUL R. GILSON

BY Christie, Parker & Hale

ATTORNEYS

Sept. 13, 1960 P. R. GILSON 2,952,415

TAPE TRANSPORT SYSTEM

Filed April 7, 1958 3 Sheets-Sheet 3

INVENTOR.
PAUL R. GILSON
BY Christie, Parker & Hale
ATTORNEYS

United States Patent Office 2,952,415

Patented Sept. 13, 1960

2,952,415

TAPE TRANSPORT SYSTEM

Paul R. Gilson, West Covina, Calif., assignor to Burroughs Corporation, Detroit, Mich., a corporation of Michigan Filed Apr. 7, 1958, Ser. No. 726,770

11 Claims. (Cl. 242—55.12)

This invention relates to tape transport systems, and more particularly, is concerned with means for controlling the reeling and unreeling of tape to achieve higher accelerations and decelerations of the tape.

If a strip of material of substantial length, such as magnetic tape, is to be transported past an operational zone, it is necessary to control the rate at which the strip is supplied to the operational zone and the rate at which the strip is taken from the operational zone. For example, in magnetic tape recording systems, a strip of magnetizable tape is fed from a supply reel to a takeup reel via an operational zone in which are located magnetic recording and reading heads. To improve the performance of magnetic tape systems, higher and higher tape speeds are demanded. At the same time, for some uses, such as memory systems and digital computers, it is desirable to stop and start as well as reverse magnetic tape in the shortest possible time, resulting in extremely rapid accelerations and decelerations of the tape. Due to the inertia of the reeling system, such accelerations and decelerations are apt to break the tape. For this reason it has been the general practice to provide slack loops on either side of the operational zone. In this manner, the tape can be stopped, started and reversed in the operational zone at high speeds where the inertia of the tape is relatively low, the corresponding change in direction of the supply and takeup reels taking place at a slower rate. Slack loops permit slower acceleration and deceleration of the high-inertia reels without breaking the tape.

Where slack loops are employed in a tape transport system, some means is provided for controlling the rate at which the supply reel unwinds the tape and the rate at which the takeup reel winds the tape, so as to keep the slack loops at an optimum length. While idler rollers have been used for this purpose, vacuum columns have found considerable favor because they provide an extremely low inertia system for maintaining the loops. Means is provided in the vacuum columns for sensing the lengths of the loops, and the reel motors are controlled to maintain the average length of the loops such that the loops are normally positioned in the central part of the longitudinal extent of the vacuum columns. With an on-off type of servo control in which the loop is caused to continuously hunt between two limit positions, tape speeds have been quite limited and the vacuum columns have necessarily been quite long.

In copending application Serial No. 646,913, filed March 18, 1957 by Paul R. Gilson, there is described a proportional type of servo control utilizing vacuum columns. The proportional control provides much tighter control of the loop length, thus permitting the tape transport to operate at much higher tape speeds. However, there is a practical limit to the rate at which the reels can be accelerated and decelerated. Even with proportional control, when this limit is reached, the only way the tape speed can be increased is to provide larger slack loops to provide greater compensation between the higher acceleration rates in the operational zone with the same acceleration rates of the reels. This results in vacuum columns of increasing length. The longer the vacuum columns, the greater the drag of the tape passing through the vacuum columns. The tape drag places a practical limitation on the loop lengths which can be used effectively in vacuum columns and hence limits the practical length of the vacuum columns.

It is the purpose of the present invention to provide a tape transport system in which the average length of the slack loops required at a given tape transport speed is materially reduced. By the present invention, where vacuum columns are used to maintain the slack loops, the length of the vacuum columns can be reduced to substantially half the length heretofore required. By the same token, for a given length of vacuum column the tape speed may be greatly increased over systems not incorporating the features of the present invention.

These results are accomplished by providing a servo system which maintains the slack loops normally at the minimum or maximum limits of the slack loop excursions within the vacuum columns, depending upon the direction of movement of the tape. This is in contrast to prior art tape systems in which the slack loops are normally operated with the loops positioned at a point midway between the maximum excursions of the loops regardless of the direction of tape movement. The present invention recognizes the fact that when the tape is reversed in the operational zone, one slack loop tends to get longer and the other slack loop tends to get shorter, due to the difference in the acceleration rates between the reels and the tape in the operational zone. Hence when the tape is running at full speed in one direction, a very short slack loop can be maintained between the supply reel and the operational zone, because when the tape is reversed in the operational zone the slack loop will tend to get longer until the reel is able to completely decelerate and accelerate again in the opposite direction. By the same token, the other slack loop must be maintained at its maximum length since when the tape is reversed in the operational zone the slack loop will tend to get shorter until the reel can decelerate and accelerate to full speed in the opposite direction.

The present tape transport system utilizes proportional sensing means for sensing the length of the tape and a null-balance servo which is modified according to the direction in which the tape is traveling so as to produce a null in the servo when the tape loop is positioned at the appropriate limit of its excursion.

For a better understanding of the invention, reference should be had to the accompanying drawings, wherein.

Figure 1:
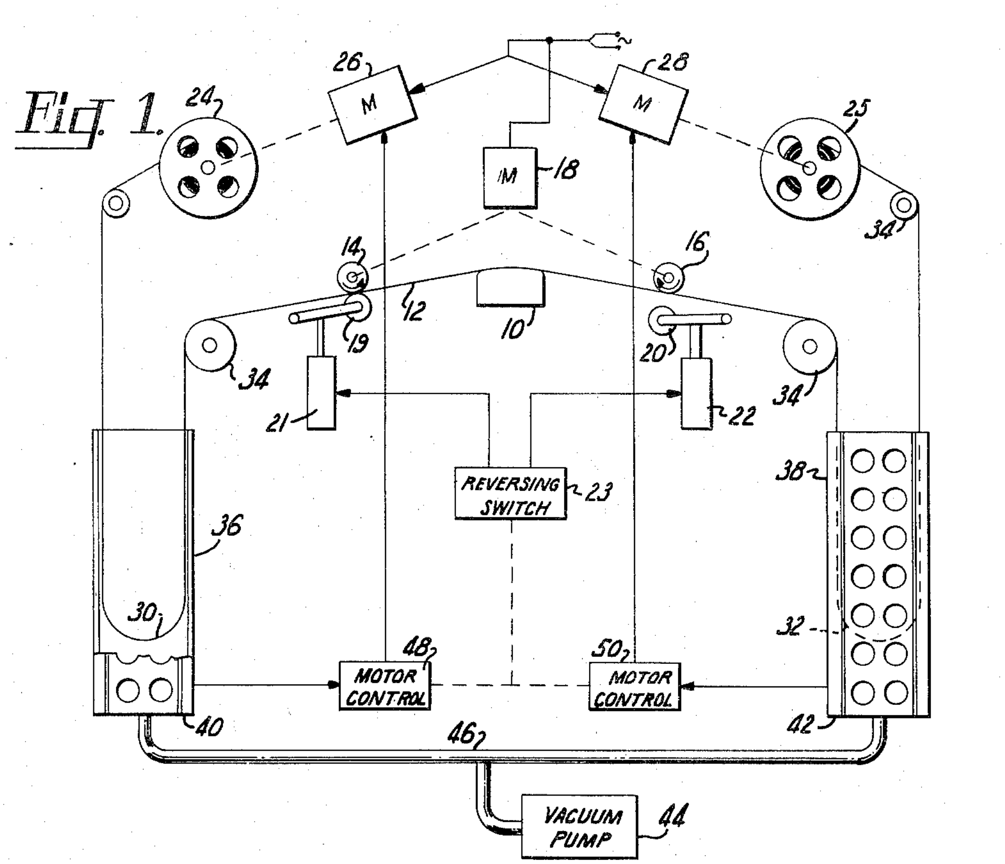
Fig. 1 is a diagrammatic view showing a tape transport system incorporating the features of the present invention.

Referring to the tape transport system of Fig. 1, the numeral 10 indicates generally an operational zone which may include magnetic pickup or playback heads past which a magnetic tape 12 is driven. The tape 12 is driven in one direction or the other selectively by means of a pair of capstans 14 and 16 having opposite directions of rotation. A suitable motor 18 driven from a source of electrical power (not shown) actuates the capstans 14 and 16. The tape 12 is selectively brought into frictional engagement with one or the other of the capstans 14 and 16 by means of pinch rollers indicated generally at 19 and 20. The pinch rollers are respectively actuated by solenoids 21 and 22 which are selectively actuated by a reversing switch 23. The tape 12 is wound off and onto a pair of reels 24 and 25 which are suitably journaled for rotation by a pair of reel motors 26 and 28.

Slack loops are formed in the tape 12, as indicated at 30 and 32, in the regions between the reel 24 and capstan 14, and the reel 25 and capstan 16, respectively. The loops are formed between suitable guides, such as indicated at 34, over which the tape 12 passes.

The loops 30 and 32 are preferably tensioned by means of a pair of vacuum columns 36 and 38. These vacuum columns include hollow inner spaces which are substantially rectangular in cross-section and are closed off at their lower ends by end walls 40 and 42 respectively. The width of the narrow walls of the vacuum columns 36 and 38 are equal to the width of the tape, so that the edges of the tape are in contact with the broad walls to form a pressure barrier. The regions below the bight portions of the slack loops 30 and 32 in the vacuum columns are evacuated by means of a vacuum pump 44. Suitable fluid couplings, such as indicated at 46, extend between the vacuum pump and the lower regions of the vacuum columns. A pressure differential created across the bight portions of the slack loops 30 and 32 by the vacuum pump 44 tensions the tape in the slack loops and does so without increasing the inertia of the tape transport system. The vacuum columns 36 and 38 are preferably of a type described in detail in the above-mentioned copending application, Serial No. 646,913.

The loop-sensing means comprises a variable capacitor that extends the length of the vacuum column and forms one of the broad walls thereof. The broad wall is of laminated construction as shown and includes a flexible sheet or plate of conductive material, as indicated at 54. See Fig. 2.

The plate 54 forms the inner surface of the fourth wall of the vacuum column. The other plate of the capacitor, indicated at 56, is made of relatively stiff and inflexible material. The two laminated wall portions 54 and 56 are suitably clamped in spaced relationship to provide a dielectric air space between. It will be readily apparent that in the region below the bight portions of the tapes where a reduced pressure is maintained by the vacuum pump 44, a differential pressure will exist across the flexible inner plate 54, causing it to bow inwardly. Above the slack loop, no such pressure differential exists and the flexible inner plate remains at its normally flat condition. Since the capacity of a condenser is inversely proportional to the distance between the plates, it will be apparent that as the slack loop moves upward in the column, increasing the length of the evacuated region of the column, the electrical capacity of the laminated wall structure is reduced. This change in capacity provides a means for sensing the position of the tape loop along the extent of the vacuum column.

The variable capacity loop-sensing means of the vacuum columns 36 and 38 are used to control the reel motors 26 and 28 through suitable motor control means 48 and 50. The motor control means is hereinafter described in detail in connection with the circuit embodiments of Fig. 2 and Fig. 3.

The variation in electrical capacity in the laminated wall structure of the vacuum column is used to control the reel motor associated with the reel adjacent the slack loop in that vacuum column. This may be accomplished by connecting the capacitor formed by the laminated wall structure in a discriminator circuit, such as indicated generally at 64, in such manner as to vary the center frequency of the discriminator and thereby produce variations in the magnitude and polarity of the D.C. output from the discriminator. The discriminator circuit 64, which may be a conventional Foster-Seeley discriminator, has the input thereof coupled to the output of an oscillator 66 of fixed frequency.

The parameters of the discriminator circuit 64 are chosen such that with the tape loop substantially in the center of the vacuum column, the discriminator produces a zero output across the output resistor 70. An increase or decrease of the capacity of the laminated wall structure, with lengthening or shortening of the slack loop in the vacuum column, shifts the effective center frequency to which the discriminator is tuned. As a result, a D.C. voltage is produced across the resistor 70, the magnitude and polarity of which depends upon the amount of shift in the resonant frequency of the tuned circuit, including the capacitor formed by the structure of the associated vacuum column. This technique of producing a D.C. voltage in response to the changes in the capacitive reactance of the condenser is not new, and other well known methods of generating a D.C. error signal may be employed. For example, the change in capacity in the laminated wall structure with movement of the tape loop may be utilized to vary the output frequency of the oscillator 66 instead of the center frequency of the discriminator 64 to accomplish the same result.

According to the improvement of the present invention, a fixed bias voltage may be introduced in series with the voltage developed across the resistor 70 by the discriminator. This fixed bias voltage may be of either a positive or negative polarity, as derived from a bias control circuit 77. For this purpose, one end of the resistor 70 is connected to each of three relay switches 71, 72 and 73. By means of the three relay switches, the lower end of the resistor 70 may be selectively connected to one end or the other, or the midpoint of a resistor 74 across which a potential is maintained by means of a battery 76. The upper end of the resistor 70 and the midpoint of the resistor 74 are connected to the input terminals of a magnetic amplifier and modulator circuit 78 for applying a drive signal to one phase winding of the two-phase reel motor 26.

With the relay 72 actuated, no bias is introduced in series with the output of the discriminator, and a null condition at the input of the magnetic amplifier 78 is achieved with the tape loop substantially in mid-position in the vacuum column. However, if one of the relay switches 71 or 73 is actuated, a series bias voltage of one polarity or the other is introduced in series with the voltage produced across the resistor 70 by the discriminator. In such circumstance, a null condition is produced at the input of the magnetic amplifier 78 only when the tape loop is displaced from the mid-position sufficiently to develop a voltage across the resistor 70 that is equal to the voltage inserted in series therewith by the battery 76. This bias voltage is of sufficient magnitude to cause the tape loop to be displaced to substantially one end or the other of the vacuum column in order to achieve a null condition at the input of the magnetic amplifier 78.

The reel motor 26 is preferably a conventional two-phase servo motor, one phase being connected to a reference voltage source (not shown) and the other phase being connected to the output of the magnetic amplifier and modulator 78. The magnetic amplifier and modulator 78 is of conventional design by means of which a D.C. input signal is modulated by an applied reference voltage to provide an A.C. output signal whose magnitude and phase are determined respectively by the magnitude and polarity of the D.C. input signal. It will be appreciated that, except when the tape is at rest, some error signal must be applied to the input of the magnetic amplifier 78 so as to maintain rotation of the reel associated with the reel motor 26. Very little displacement of the tape loop from the null condition is required to produce the steady state operating torque of the reel motor 25.

The three relays controlling the switches 71, 72 and 73 respectively, are actuated by a ring counter circuit. The counter circuit 80 is a modulo 3 counter, i.e., a counter with three stable states, and may be of a type described in "High Speed Computing Devices," Engineering Research Associates, McGraw-Hill Book Co., 1950, page 20. The counter 80 may be set to any one of its three stable states by three separate inputs which are controlled from the reversing switch 23. As pointed out above, the reversing switch 23 controls pinch rollers through solenoids 21 and 22, the switch having three positions, namely, Forward, Reverse, and Stop. Switch 23 energizes the respective solenoids from a potential source 82.

With the reversing switch 23 in the Stop position, the counter 80 is set so as to energize the relay switch 72. As a result, no bias is introduced into the discriminator output, and the tape loop seeks a mid-position in the vacuum column. If the switch 23 is then thrown to the Forward position, the counter 80 is set to its count position in which the relay actuating the relay switch 71 is energized, thereby introducing a bias into the output of the discriminator for shifting the null balance point of the tape loop in the vacuum column. However, the counter 80 is actuated through a delay circuit 84 which delays the opening of the switch 72 and the closing of the switch 71 by a predetermined time interval following the setting of the switch 23 to the Forward position. The reason for the delay circuit 84 is to allow the reel motor 26 to come up to speed before the null balance position of the tape loop in the vacuum column is shifted to one end of the vacuum column. This permits the servo to take full advantage of the error signal which is developed by the displacement of the tape loop from the center of the column to accelerate the reel motor 26 up to speed.

Similarly, the counter 80 may be set to close the relay switch 73 by moving the reversing switch 23 to the Reverse position. Again a delay circuit 86 is introduced between the switch 23 and the counter 80 in order to delay the shifting of the null balance position of the loop in the vacuum column until the reel motor can reverse its direction and accelerate up to the desired speed in the opposite direction after actuating the reversing switch 23.

It will be appreciated that the delay circuits 84 and 86 are essential to take advantage of the shifting of the null point to one end or the other of the vacuum column, depending on the direction of the tape movement. As pointed out above, the reason for shifting the null position in the vacuum column is to take advantage of the full length of the vacuum column during the transient condition in which the direction of tape feed is reversed. Delay circuits 84 and 86 act to retain the null condition at the previous position in the vacuum column when the reversing switch 23 is actuated, thereby permitting the servo controlling the reel motor to take full advantage of the large error signal developed by displacement of the tape to as much as the full length of the vacuum column from the previous null-operating position before switching the servo to the new null-operating position at the opposite end of the vacuum column.

An identical control circuit 50 is associated with the reel motor 28. Thus the control circuit includes an oscillator 88 coupled to the input of a discriminator circuit 90 which includes a variable capacitor 91 formed by the wall structure of the associated vacuum column 38. An adjustable D.C. bias is introduced in series with the output of the discriminator 90 by a bias control circuit 92 identical to the above-described bias control circuit 77. The sum of the output of the discriminator 90 and bias control circuit 92 is applied to the input of a magnetic amplifier and modulator circuit 94 for controlling the two-phase servo motor 28.

The bias control circuit 92 is controlled by a counter 96 identical to the counter 80 above described. The reversing switch 23 sets the counter 96, the counter 96 being set in the Forward or Reverse position of the switch 23, through suitable delay circuits 98 and 100 having identical delay times as the circuits 84 and 86. In fact, a single delay circuit could be used for the delay circuits 84 and 100, and another single delay circuit could be used for the delay circuits 86 and 98.

Figure 2:
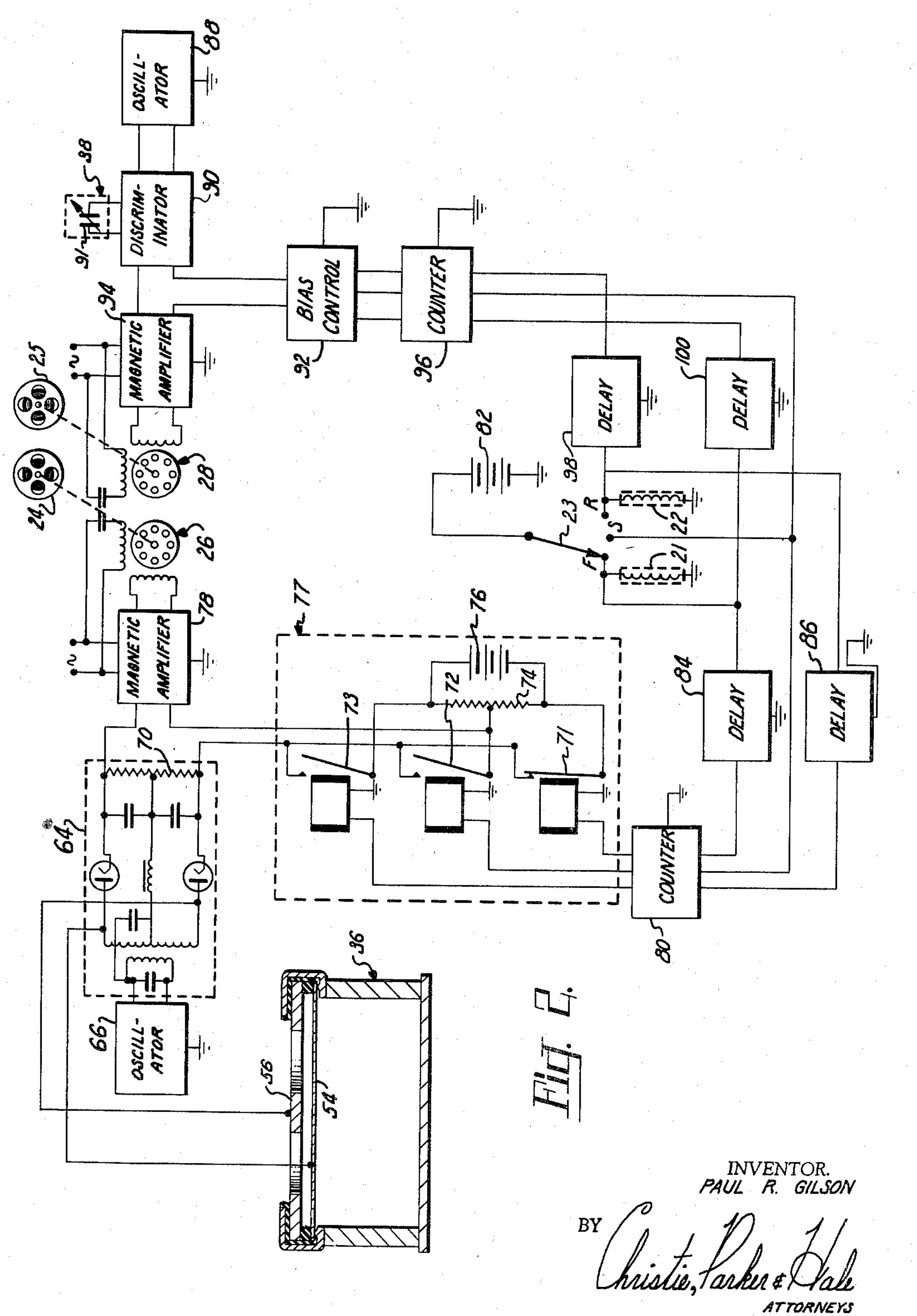
Fig. 2 is a schematic circuit diagram of one embodiment of a suitable control circuit for the tape transport system.

In the circuit above-described in connection with Fig. 2, fixed delays are used to permit the entire length of the vacuum column to be used in switching from forward to reverse and vice versa. The fixed delay does not provide for switching from one null condition to the other on reversing the tape drive at the optimum time under all conditions, because it is inflexible. The circuit of Fig. 2 also teaches the use of fixed bias added to the output of the discriminator. This means that when the tape loop is located around its null condition with very small or zero displacement error, the discriminator circuit is operating not in its balanced condition, but in an unbalanced condition sufficient to compensate for the added fixed bias. It is preferable from the servo design standpoint that the discriminator always work around its balanced condition where it provides more linear control. The circuit of Fig. 3 shows an alternative circuit arrangement which avoids the use of fixed bias and permits the discriminator to operate around its balance point under all normal conditions of drive.

Figure 3:
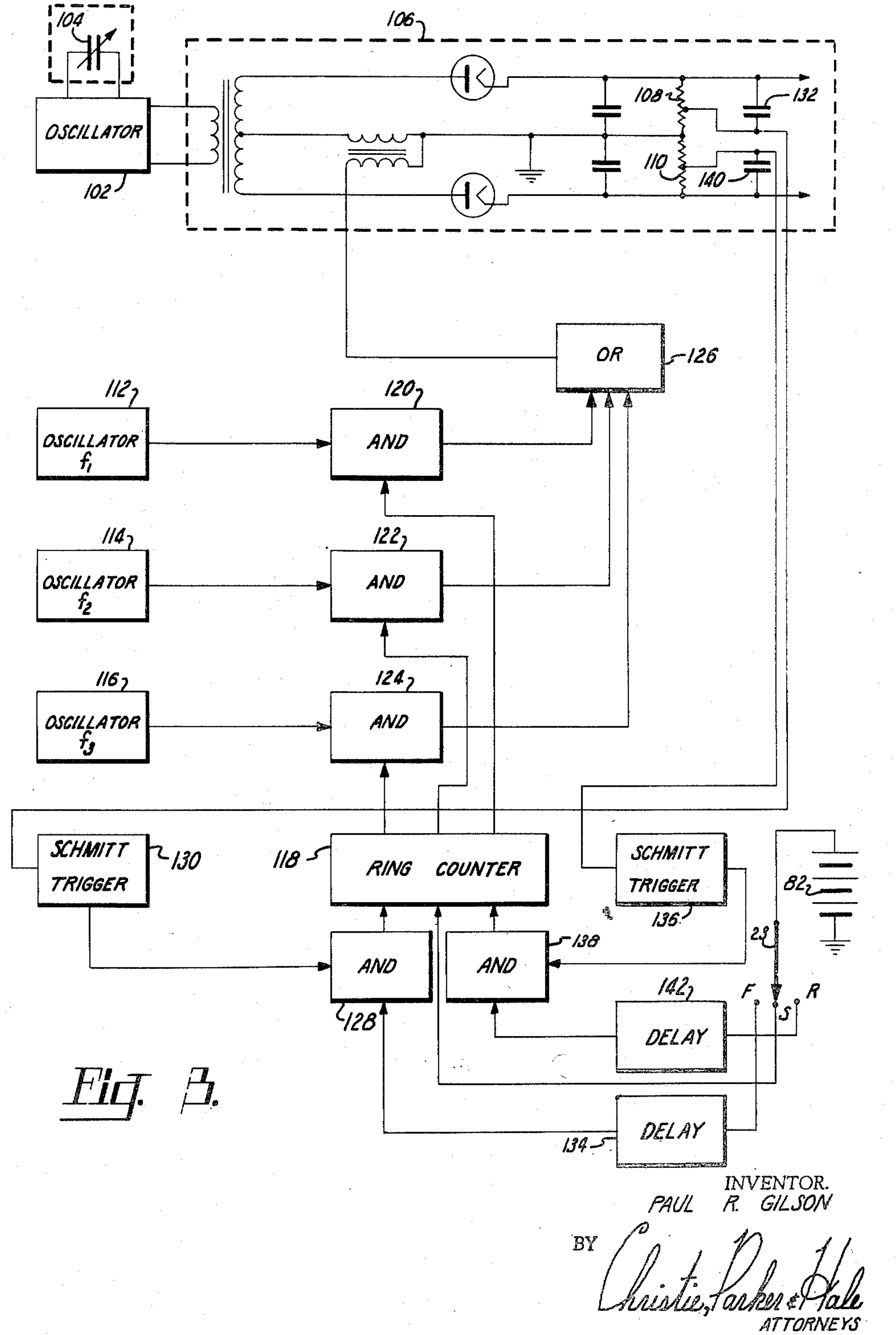
Fig. 3 is a schematic circuit diagram of an alternative control circuit for the tape transport.

In the circuit of Fig. 3, a control oscillator 102 is provided whose frequency is varied in response to the variable capacitance of the associated vacuum column, as indicated by the variable capacitor 104. The output of the oscillator 102 is coupled to the control input of a conventional phase detector circuit indicated generally at 106. The output of the phase detector 106, as derived across the load resistors 108 and 110, may be applied to the input of the magnetic amplifier 78 of Fig. 2.

A reference signal is applied to the phase detector 106 from one of three different reference oscillators 112, 114, and 116. The frequency $f_1$ of the oscillator 112 is chosen to correspond to the frequency of the oscillator 102 when the tape loop is adjacent one end of the vacuum column, while the frequency $f_3$ of the oscillator 116 is chosen to correspond to the frequency of the oscillator 102 when the tape loop is adjacent the opposite end of the vacuum column. The frequency $f_2$ of the oscillator 114 is chosen to correspond to the frequency of the oscillator 102 when the tape loop is in the center of the vacuum column. The position of the tape loop in the vacuum column at which zero output is produced by the phase detector 106 is determined by which of the three oscillators 112, 114 and 116 is selected as the reference signal for the phase detector. Thus no matter which of the three null operating points in the vacuum column is selected, as determined by which of the three reference oscillators is selected, the phase detector operates around its balanced or zero output condition.

Selection of which reference oscillator is to be coupled to the phase detector 106 is determined by the reversing switch 23 which controls the setting of a ring counter 118 similar to the counter 80 described above. The ring counter 118, in its three stable states, respectively gates open one of three "and" gates 120, 122, and 124 which in turn are coupled to the output of the oscillators 112, 114 and 116 respectively. The gated outputs of the oscillators are coupled through an "or" gate 126 to the reference signal input of the phase detector 106.

With the reversing switch 23 in the Stop position, the ring counter 118 is set so as to gate open the "and" circuit 122, thereby applying the output of the oscillator 114 to the phase detector 106. This establishes a null condition corresponding to the tape loop being centered in the vacuum column.

When the reversing switch 23 is switched to the Forward position, for example, the oscillator 114 continues to supply the reference signal to the phase detector 106 until the ring counter is changed. Setting of the ring counter 118 to close the gate 122 and open the gate 124 is controlled through an "and" gate 128 which connects the output of the switch 23 in its forward position to the ring counter. The "and" gate 128 is controlled by a Schmidt trigger circuit 130 which in turn is controlled by an output signal derived from the phase detector 106. To this end, the Schmidt trigger is connected to a tap on the output resistor 108. A capacitor 132 couples the input of the Schmidt trigger 130 to the ungrounded end of the resistor 108. The capacitor 132 provides a signal at the input of the Schmidt trigger 130 which is substantially the differential of the error signal appearing across the output of the discriminator 106, i.e., a signal which goes to zero when the rate of change of the error signal becomes zero.

The Schmidt trigger circuit 130 is conventional in design and provides an output level which is at one of two discrete values depending upon the level of the applied input voltage. Normally the output from the Schmidt trigger 130 with substantially zero error signal across the output of the discriminator 106 is such as to bias open the "and" gate 128. With a sudden transient condition, such as reversing the switch 23 as by moving it to the Forward position from either the Stop position or the Reverse position, the resulting large error signal developed across the output of the discriminator raises the level at the input of the Schmidt trigger 130 causing it to flip to its other stable state in which the "and" circuit 128 is biased off.

When the error signal stops changing and reaches a condition where it begins to reduce again due to the acceleration of the reel motor, causing the tape loop to return to its initial null position, the Schmidt trigger 130 returns to its initial stable state, opening the "and" gate 128. At this time, due to the potential derived from the source 82 being applied to the "and" gate 128, the ring counter is switched to its stable state in which the "and" circuit 124 is gated open and the output of the oscillator 116 is applied as the reference to the phase detector 106.

A delay circuit 134 is provided between the Forward stop of the reversing switch 23 and the "and" gate 128 of very short delay time. The purpose of this delay circuit 134 is to prevent the ring counter from being switched immediately on the closing of reversing switch 23 in the Forward position, since the "and" circuit 128 is initially gated open. The delay circuit 134 gives the Schmidt trigger circuit 130 time to be actuated by the developing error signal from the phase detector 106 to close the "and" gate 128 and prevent immediate switching of the ring counter 118.

A similar Schmidt circuit 136 is used to set the ring counter 118 to its third stable condition in which the oscillator 112 may be connected to the phase detector through the "and" gate 120. To this end, the Schmidt trigger controls "and" gate 138 which couples the Reverse contact of the reversing switch 23 to a setting input of the ring counter 118. The Schmidt trigger 136 is controlled by an error rate signal derived from the output of the phase detector 106. Thus the Schmidt trigger input is coupled to a tap on the phase detector load resistor 110. A differentiating capacitor 140 couples the input of the Schmidt trigger to the ungrounded end of the resistor 110. A slight delay is provided by a delay circuit 142 between the reverse contact of the reversing switch 23 and the "and" gate 138. This prevents the ring counter from being set immediately when the switch 23 is set to the reverse position. Thus the ring counter 118 cannot be set until the Schmidt trigger is turned to its initial condition which occurs only after the rate of change of the error signal across the output of the detector 106 returns to zero following the transient condition produced by changing the reversing switch 23.

To better understand the operation of the tape control circuit as shown in Fig. 3, consider the reversing switch 23 to be initially in the Stop position. In this case the ring counter 118 is set so as to gate open the "and" circuit 122, thereby coupling the intermediate frequency oscillator 114 to the reference input of the phase detector 106. As a result a zero error signal develops across the output of the phase detector when the tape loop in the associated vacuum column is at a point intermediate the ends of the vacuum column.

If then the reversing switch 23 is set to the Forward position, the forward tape drive solenoid 21 is energized, causing the tape to be moved in a forward direction through the operational zone. This causes a change in length of the tape loop in the vacuum column, producing an error signal across the output of the phase detector which results in a torque being developed by the associated servo motor in a direction to try to return the tape loop to its initial central null position in the vacuum column. Because of the delay circuit 134, moving the switch 23 to the Forward position does not immediately actuate the ring counter 118. The counter acts as a memory device maintaining the previous null condition in the vacuum column and associated servo circuit. As the reel motor continues to accelerate, the point is reached where the error signal developed by the phase detector reaches its maximum condition and thereafter is reduced, by further acceleration of the reel motor, back to zero. At the point where the error signal stops increasing and begins to decrease, i.e., where the error rate reaches zero, the Schmidt trigger 130 returns to its initial stable condition in which the "and" gate 128 is open. At this time the ring counter 118 is set to open the "and" gate 124, so as to couple the oscillator 116 to the reference input of the phase detector 106. The tape loop now assumes a new null position adjacent one end of the vacuum column, where it is in a position to utilize the maximum length of the vacuum column when the switch 23 is moved back to the Stop position or moved to the Reverse position. Thus it will be appreciated that by the arrangement of the circuit of Fig. 3, the null position in the vacuum column is switched only after the tape loop has reached its maximum excursion from the previous null position following the starting, stopping or reversing of the tape drive by means of the reversing switch 23.

From the above description it will be seen that when the tape is reversed from going full speed in one direction to full speed in the other direction through the operational zone 10, each of the slack loops has the full vacuum column length in which to travel during the time in which the reels are being reversed and brought up to speed. Thus, in contrast to systems in which the slack loops are maintained in the center of the vacuum columns during the steady state forward or reverse drive condition, by the present invention, slack loops are maintained in one extreme or the other of the vacuum columns during the steady state operating condition. In this manner, the effective length of the vacuum columns is essentially doubled.

What is claimed is:

1. A tape drive system comprising reversible means for driving the tape in either of two opposite directions, tape storage means including a reel and reel drive motor, means for establishing a slack loop in the tape between the tape drive means and the reel, means for generating a control signal indicative of the length of the loop, means for generating a reference signal, means responsive to the direction of the reversible tape drive means for setting the reference signal to one of two different predetermined values depending on the direction of movement of the tape by the drive means, means for producing an error signal with changes in the control signal with relation to the reference signal, whereby the error signal is modified with changes in direction of the tape, and means for controlling the reel motor in response to the error signal to maintain the correct loop length, the average length of the loop being determined by the reference signal.

2. Apparatus as defined in claim 1 wherein the means for establishing the slack loop comprises a vacuum column, the slack loop forming a piston in the column.

3. Apparatus as defined in claim 1 wherein said means for varying the reference signal shifts the reference signal to produce zero error signal with a maximum loop length in the column when the drive means is feeding tape to the reel and shifts the reference signal to produce zero error signal with a minimum loop length in the column when the drive means is withdrawing tape from the reel.

4. Apparatus as defined in claim 3 wherein the means for varying the reference signal shifts the reference signal to produce zero error signal with an intermediate loop length in the column when the drive means is not moving the tape.

5. Tape transport system comprising a pair of tape reels for storing tape, the tape extending between the reels, reversible drive means engaging the tape intermediate the two reels, means for establishing slack loops on either side of the reversible drive means, reel motors for controlling the reels to feed out or take up tape as it feeds through the drive means, means for sensing the lengths of the loops in the vacuum columns and generating control signals indicative of the respective loop lengths, means including adjustable reference signals for generating error signals in response to changes in the control signals in relation to the reference signals, means responsive to the direction of tape feed by the reversible drive means for setting each of the reference signals to one of two different predetermined values, said setting means producing respective zero error signals for different loop lengths in the respective slack loops, and means for controlling the reel motors in response to the respective error signals to maintain the slack loops at predetermined lengths as established by the reference signals.

6. Apparatus as defined in claim 5 wherein the means responsive to the direction of tape feed shifts the reference signal controlling the reel motor of the reel receiving tape from the drive means to produce zero error signals with a relatively long loop and shifts the reference signal controlling the reel motor of reel playing out tape to produce zero error signal with a relatively short loop.

7. Apparatus for reeling a flexible strip of material at high speed comprising means engaging the material for selectively driving the strip in either direction past a reference point, motor driven means for winding and unwinding the strip of material as the strip is driven past said reference point depending on the direction the strip is driven, means for forming and tensioning the strip into a slack loop between the driven means and the winding means, means for sensing the length of the loop, means responsive to said loop sensing means for generating a signal that varies with displacement of the loop along the length, means responsive to an adjustable reference signal for generating an error signal in response to said loop length indication signal, means responsive to said error signal for changing the magnitude and direction of torque of said motor driven winding and unwinding means with changes in the error signal, means responsive to the direction of movement of the strip past said point for adjusting said reference signal, said means setting the reference signal to one of three values depending on whether the strip is being driven forward or driven backward, or is at rest, and means for delaying the adjustment of the reference signal following a reversal of the direction the strip is being driven.

8. Apparatus as defined in claim 7 wherein the reference signal generating means includes a fixed bias voltage source which is added to or subtracted from the loop length indicative signal.

9. Apparatus as defined in claim 7 wherein the delay means has a fixed predetermined delay time.

10. Apparatus as defined in claim 7 wherein the loop length signal means includes an oscillator whose frequency is varied in response to changes in loop length, wherein the reference signal generating means includes three reference oscillators, wherein the error signal generating means includes a phase detector connected to the variable frequency oscillator, and wherein the adjusting means includes means for selectively connecting one of the three reference oscillators to the phase detector depending on the direction the strip is being driven.

11. Apparatus as defined in claim 10 wherein the delay means includes means for generating a signal indicative of the rate of change of the error signal from the phase detector, and means for delaying the changing of the reference oscillators until the rate of change of error signal returns to zero following the changing of direction of strip material.

References Cited in the file of this patent

UNITED STATES PATENTS

| | | |
|---|---|---|
| 2,778,634 | Gams et al. | Jan. 22, 1957 |
| 2,792,217 | Weidenhammer et al. | May 14, 1957 |

Disclaimer 2,952,415.—*Paul R. Gilson*, West Covina, Calif. TAPE TRANSPORT SYSTEM. Patent dated Sept. 13, 1960. Disclaimer filed Oct. 11, 1962, by the assignee, *Burroughs Corporation*.

Hereby enters this disclaimer to claims 1 and 3 of said patent.

[*Official Gazette November 27, 1962.*]

Notice of Adverse Decision in Interference

In Interference No. 92,579 involving Patent No. 2,952,415, P. R. Gilson, Tape transport system, final judgment adverse to the patentee was rendered Oct. 9, 1962, as to claims 1 and 3.

[*Official Gazette December 4, 1962.*]

Notice of Adverse Decision in Interference

In Interference No. 93,847 involving Patent No. 2,952,415, P. R. Gilson, Tape transport system, final judgment adverse to the patentee was rendered June 23, 1964, as to claims 2, 5 and 6.

[*Official Gazette October 27, 1964.*]

Disclaimer

2,952,415.—*Paul R. Gilson*, West Covina, Calif. TAPE TRANSPORT SYSTEM. Patent dated Sept. 13, 1960. Disclaimer filed June 21, 1965, by the assignee, *Burroughs Corporation*.

Hereby enters this disclaimer to claims 2, 5 and 6 of said patent.

[*Official Gazette September 28, 1965.*]